June 28, 1932. A. T. KOPPE 1,865,262
PHOTOCOMPOSING MACHINE
Filed June 6, 1927 8 Sheets-Sheet 7
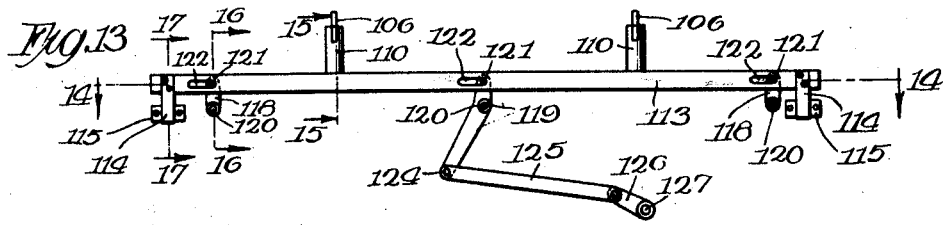
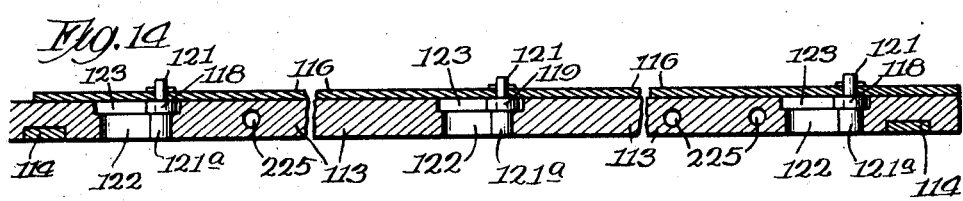
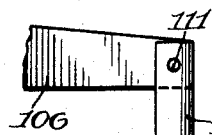
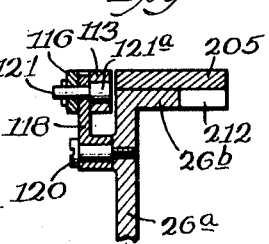
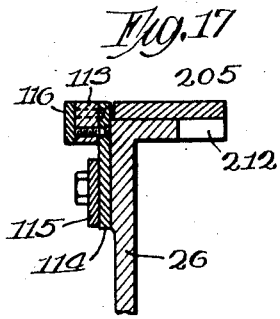
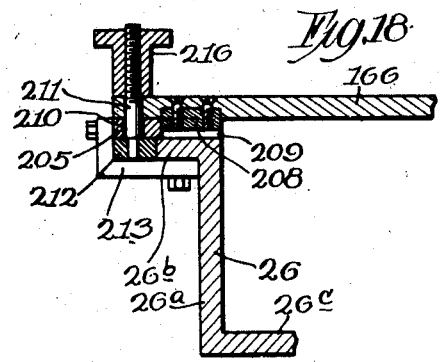
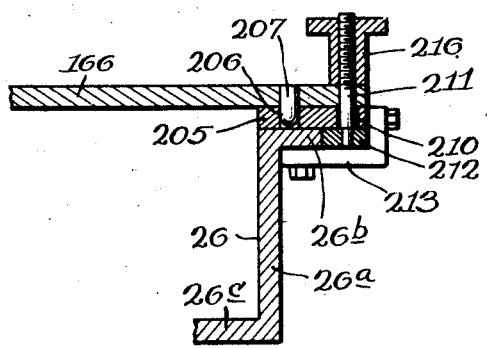
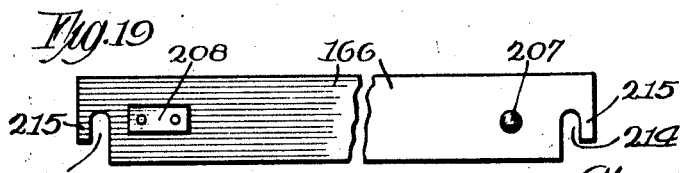
Inventor:
Alexander T. Koppe
By Rector, Hibben, Davis & Macauley
Attys.

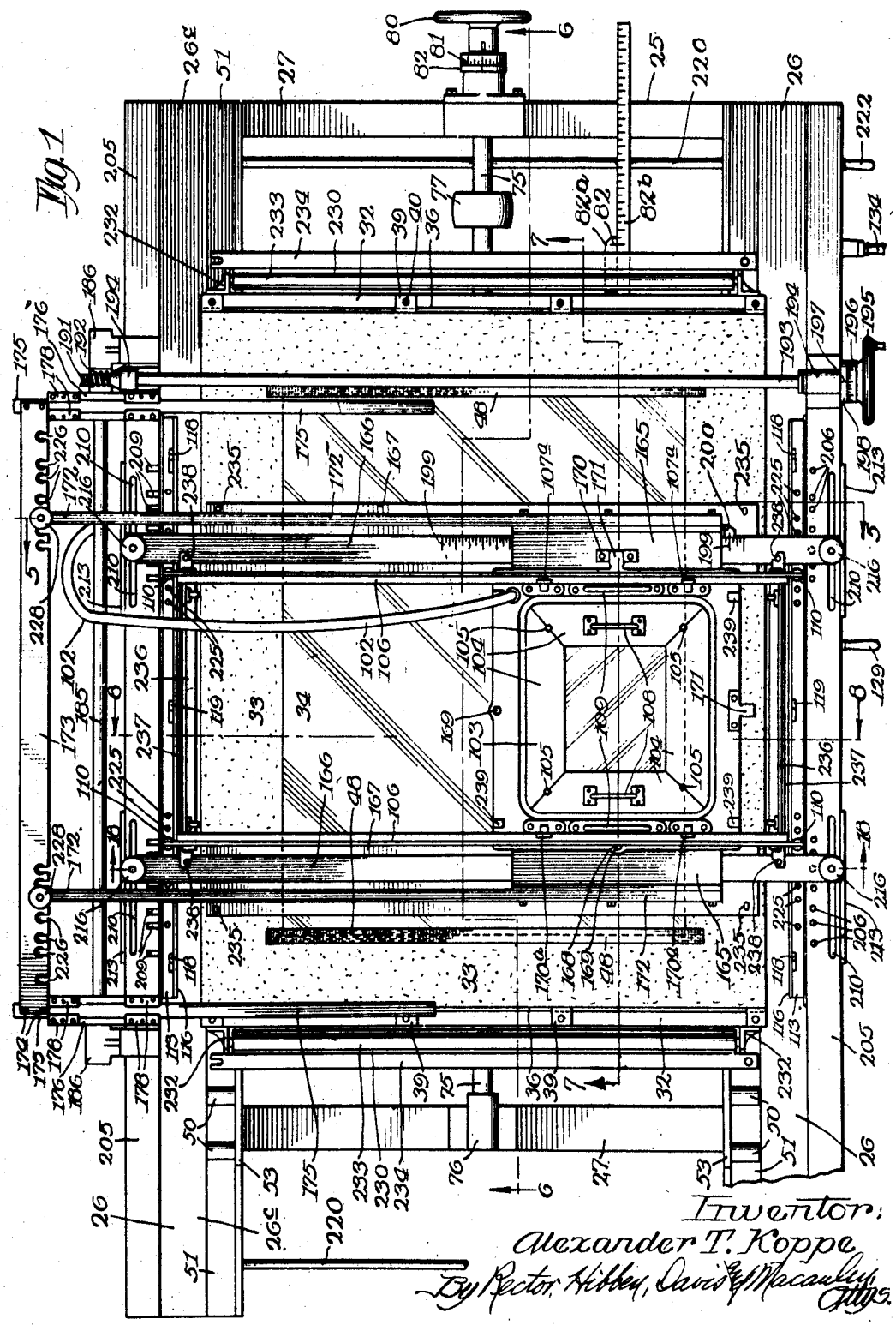

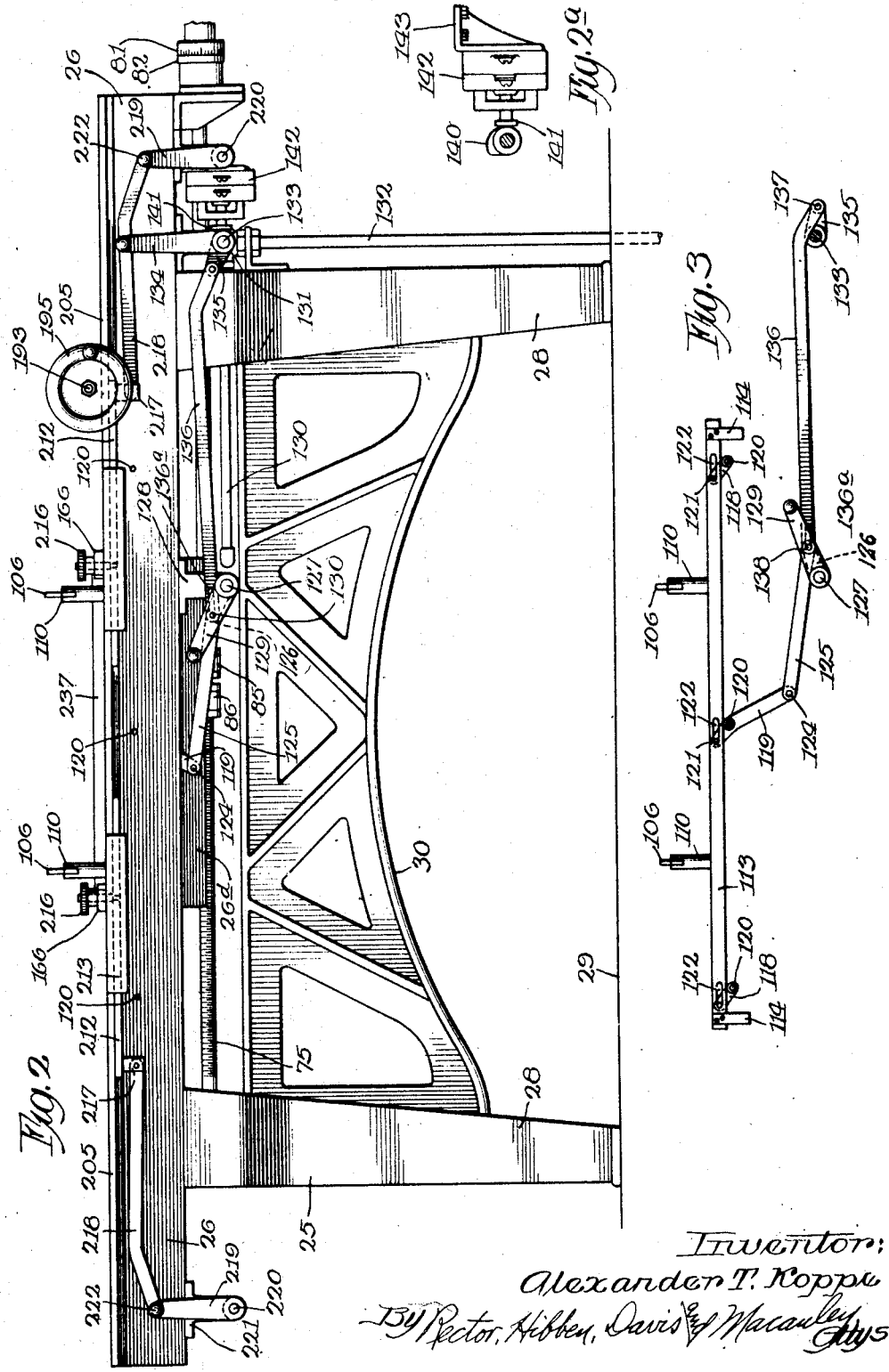

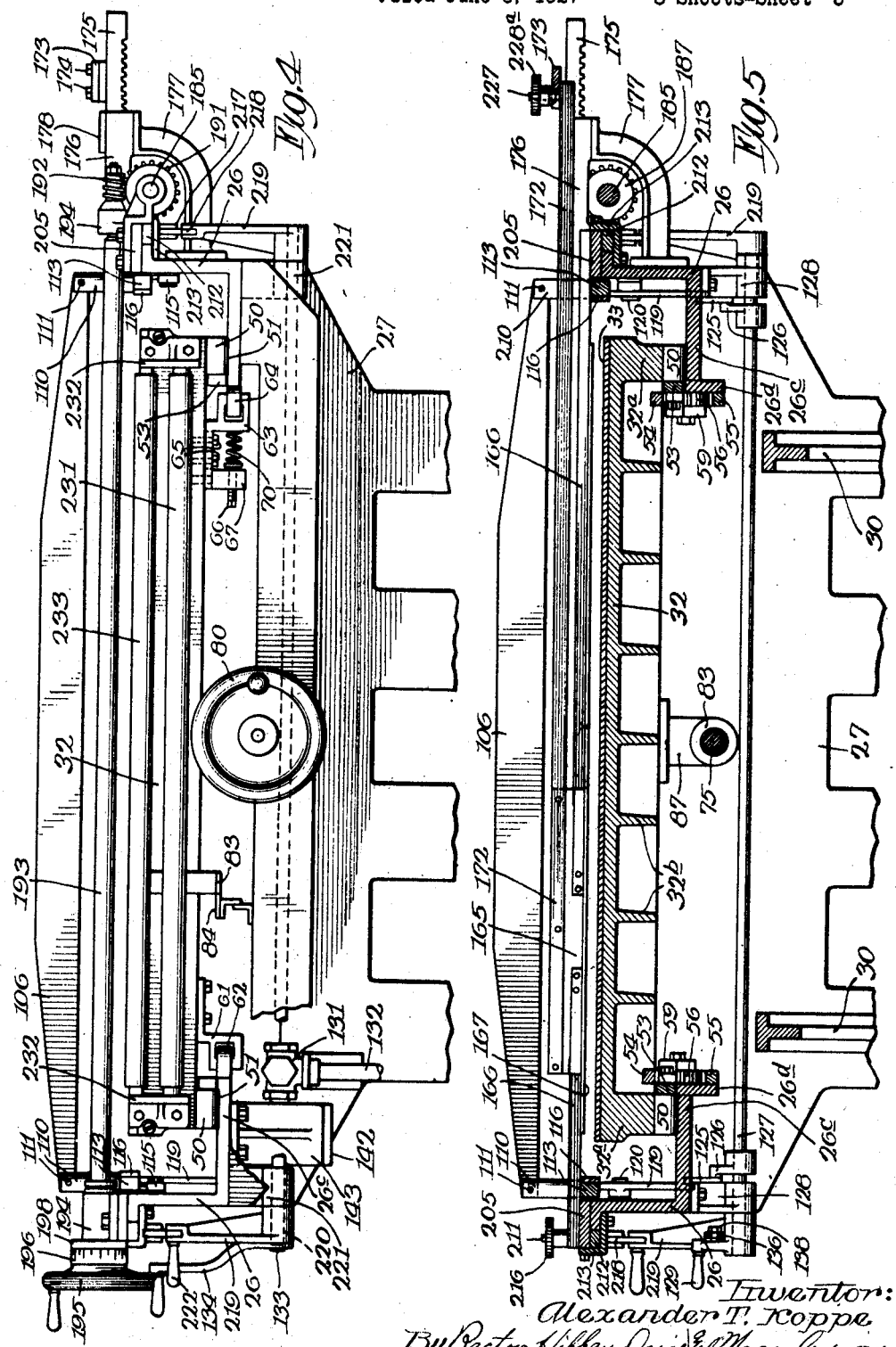

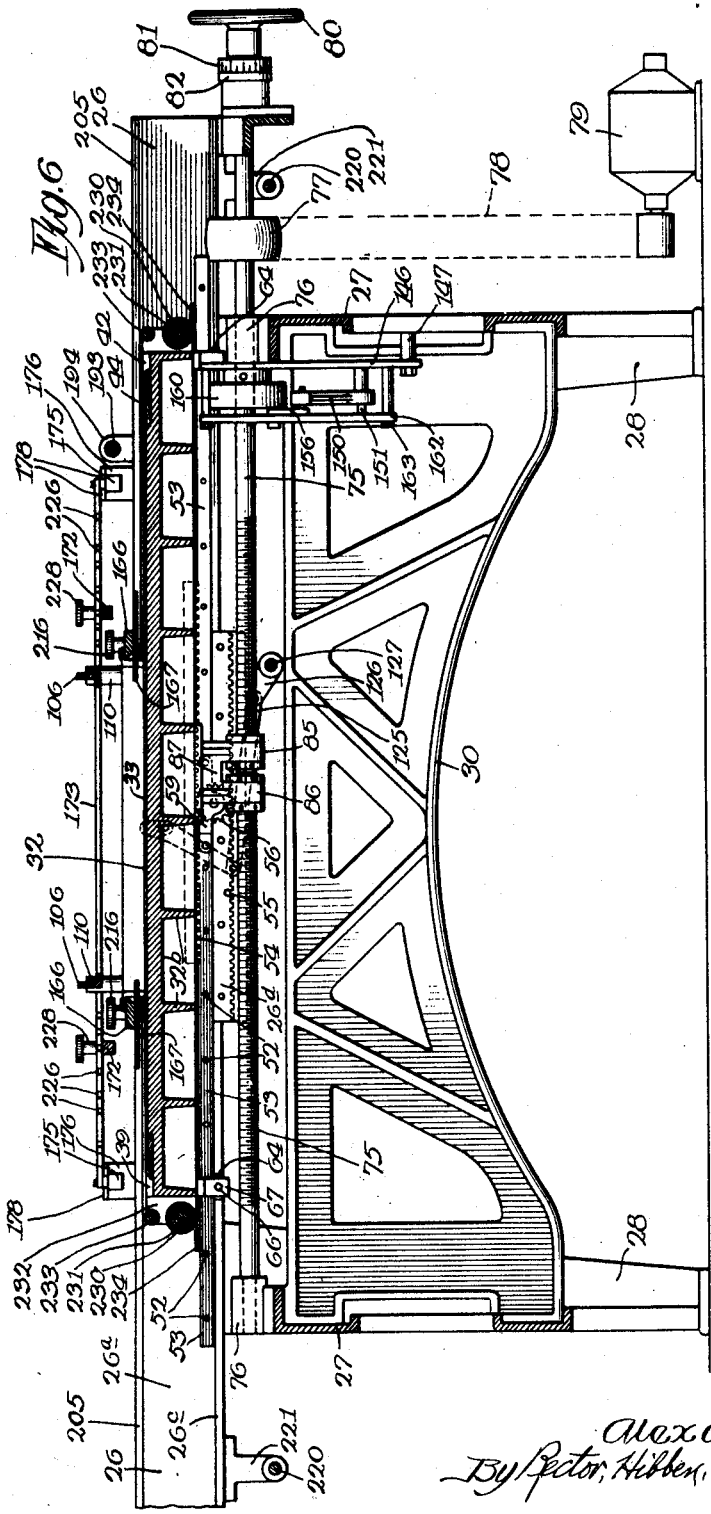

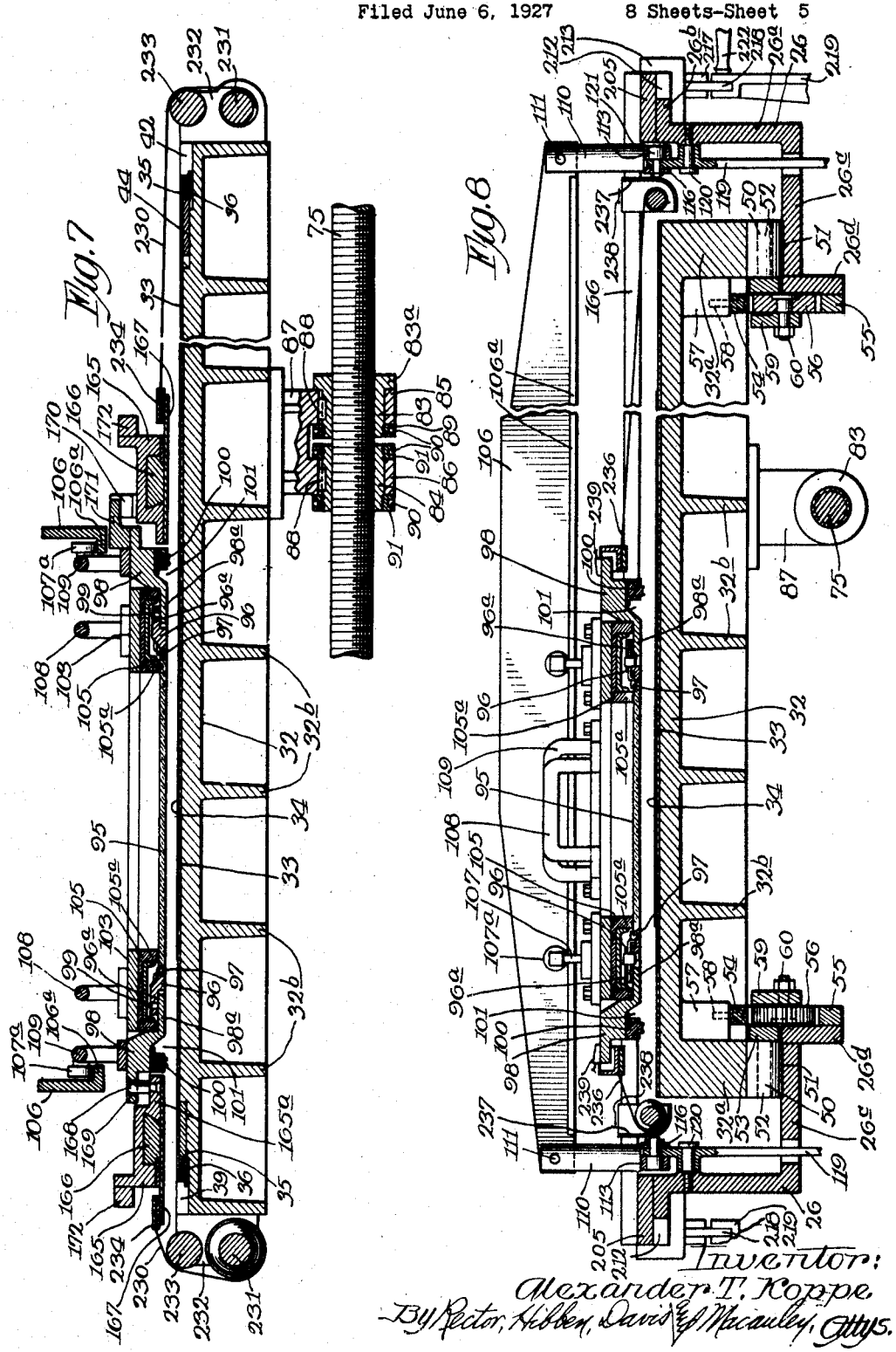

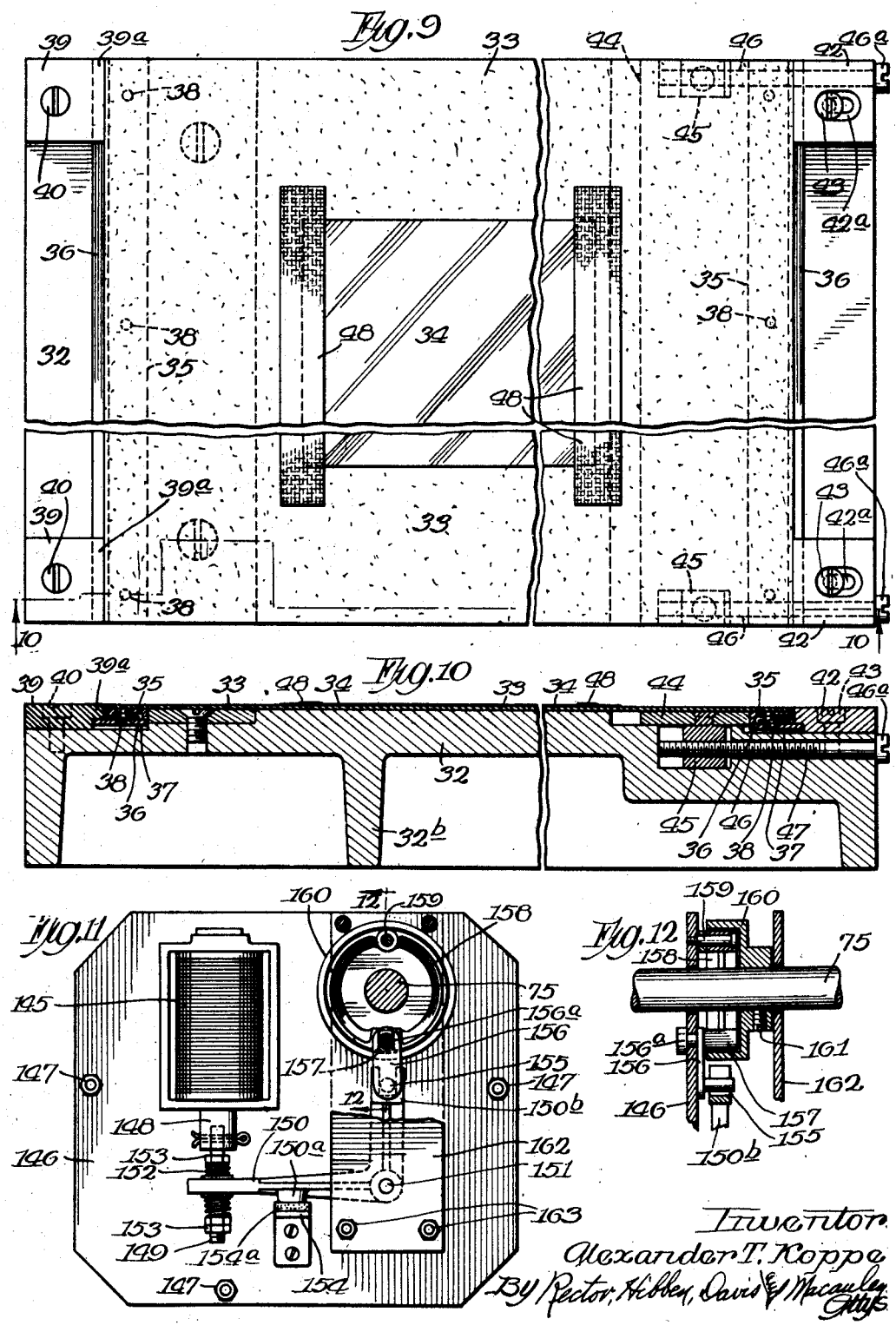

June 28, 1932.   A. T. KOPPE   1,865,262
PHOTOCOMPOSING MACHINE
Filed June 6, 1927   8 Sheets-Sheet 8
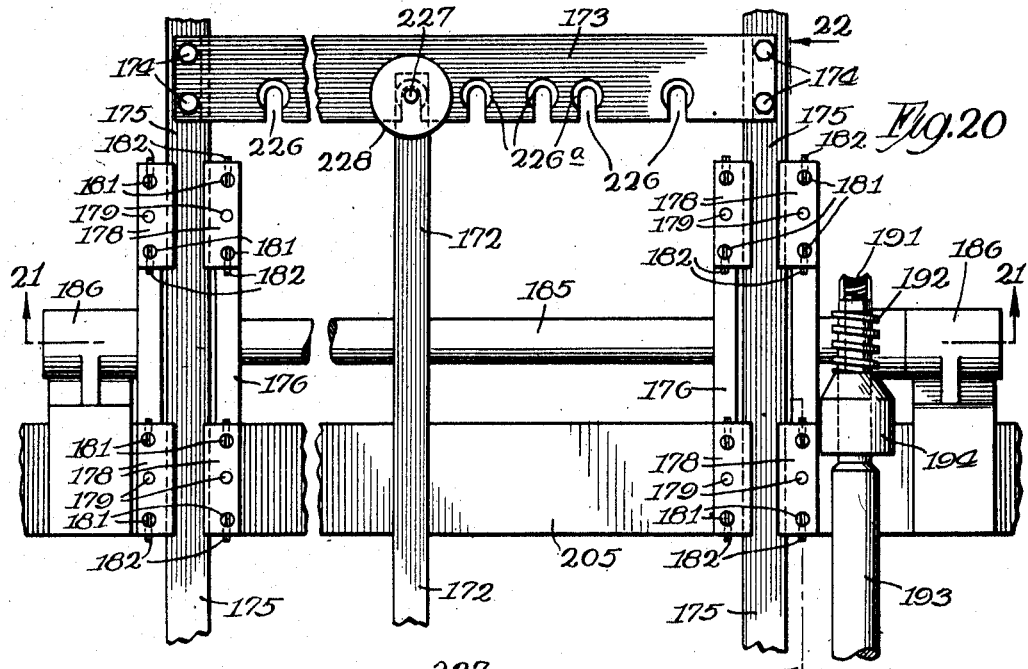
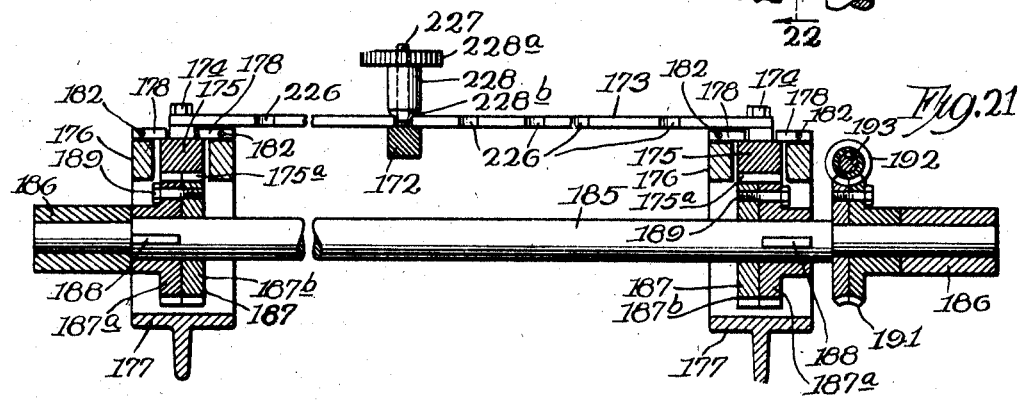
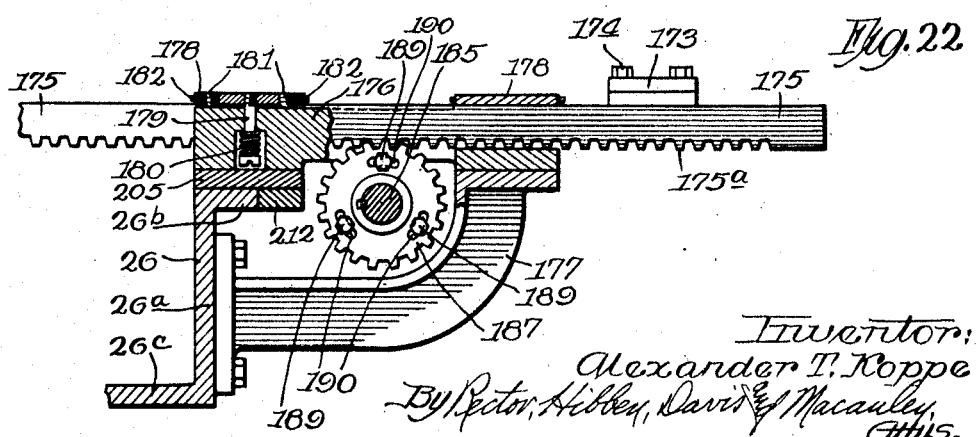

Patented June 28, 1932

1,865,262

UNITED STATES PATENT OFFICE

ALEXANDER T. KOPPE, OF CHICAGO, ILLINOIS, ASSIGNOR TO DIRECTOPLATE CORPORATION, OF CHICAGO, ILLINOIS, A CORPORATION OF ILLINOIS

PHOTOCOMPOSING MACHINE

Application filed June 6, 1927. Serial No. 196,948.

This invention relates to improvements in photo composing machines of the general type described and claimed in my reissue Letters Patent No. 16,567, reissue of March 8th, 1927, the original application for which was filed June 30, 1922 and resulted in original Patent No. 1,510,007.

In machines of this type, the impressions or designs carried by one or several negatives are transferred photographically to a sensitized surface, preferably the sensitized surface of a zinc plate, which plate is subsequently employed in an offset press for printing the transferred designs or impression upon paper sheets, known as press-sheets. For purposes of economy in the making of the press plates, and also in the subsequent printing operations, it is desirable that a number of designs or impressions be reproduced photographically on the sensitized plates in the photo composing machines to which this invention relates and the press-plate is therefore preferably much larger in area than the area of the design on the negatives so that a number of designs may be repeated over the surface of the press-plate, or a number of separate designs placed thereon, for simultaneous production in the subsequent printing operation in the offset press. Means are, therefore, provided in machines of this class, for adjusting the negatives to different positions over the surface of the sensitized plate, or for shifting the sensitized plate with respect to the position of the negatives, in combination with means for bringing the negative and sensitized plate into printing contact in each of their relative positions.

The principal object of the present invention is to provide a photo composing machine having improved means for effecting relative adjustments of the sensitized surface and the negatives. A further object is to provide means for effecting relative separation of the negative and the sensitized surface preliminary to the operation of effecting relative lateral adjustment thereof. Still another object is to provide a photo composing machine having a bed for supporting the sensitized press-plate in combination with improved means for effecting movement of the bed relatively to the position occupied by the negative. A further object of the invention is to provide a photo composing machine in which relative adjustment of the negative and the sensitized plate is effected in one direction by moving a bed upon which the press-plate is supported and in which relative adjustment is effected in a transverse direction by effecting movement of a negative carrying frame in a supporting structure. Still another object is to provide a photo composing machine having a negative supporting structure capable of lateral adjustment by improved means for permitting the insertion of negative carrying frames of different dimensions or to permit the insertion of said frames in different right-angular positions. A further feature of the invention is a provision of improved mechanisms for effecting adjustment of the negative carrying frames in one direction over the surface of the sensitized plates having, preferably, means for permitting further adjustments to be accomplished with different widths of negative carrying frames. Still another object of the invention is to provide improved mechanism for effecting lateral adjustment of the supporting structure by which the negative is carried and for securing the parts of said structure in precise relative adjustment. A further object of the invention is to provide a photo-composing machine in which the pressure contact of the negative and sensitized surface is brought about by the operation of a vacuum in combination with improved safety means for preventing relative lateral adjustment of the negative and sensitized surface when the said pressure means is in operation. Still another object of the invention is to provide a photo-composing machine having a supporting bed for the sensitized plate adapted to project beyond all the edges of said plate and to permit the operation of the vacuum pressure means in positioning images of negatives adjacent to all edges of the sensitized plate. Other objects relate to various features of construction and arrangement which will appear more fully hereinafter.

The nature of the invention will be understood from the following specification taken with the accompanying drawings in which one embodiment is illustrated. In the drawings, Figure 1 shows a top plane view of the improved photo-composing machine, illustrating the protected curtains for the exposed portions of the sensitized plate withdrawn from their normal covering position;

Fig. 2 shows a front elevation of the photo-composing machine illustrated in Fig. 1;

Fig. 2ª shows a detailed view of switch mechanism operated by a cam on the shaft which controls the vacuum valve, the switch being adapted to control the operation of safety mechanism adapted to prevent the movement of the adjustable bed when the vacuum pressure means is in operation;

Fig. 3 shows a somewhat diagrammatic front elevation of the operating mechanism by which the negative supporting frame is moved normally to the surface of the sensitized plate, and illustrating the safety mechanism which prevents the operation of that mechanism when the vacuum pressure system has been actuated to secure pressure contact of the negative and sensitized plate;

Fig. 4 shows a partial end elevation of the photo-composing machine, looking toward the left as viewed in Fig. 1;

Fig. 5 shows a transverse section through the machine taken on the line 5—5 of Fig. 1;

Fig. 6 shows a longitudinal section taken on the line 6—6 of Fig. 1;

Fig. 7 shows a partial longitudinal section taken on the line 7—7 of Fig. 1, illustrating the protective curtains as being drawn up to cover portions of the sensitized plate at the sides of the negative supporting structure;

Fig. 8 shows a transverse section taken on the line 8—8 of Fig. 1, but illustrating the curtains between the sides of the curtain structure as being drawn up and attached to opposite sides of the vacuum frame structure;

Fig. 9 shows a top plan view of the adjustable bed of the machine, with parts thereof broken away, illustrating the position of the sensitized plate on the underlying rubber blanket, and illustrating the means by which the blanket is stretched taut to the bed;

Fig. 10 shows a longitudinal section on the line 10—10 of Fig. 9;

Fig. 11 shows a plan view of a magnetically operated break mechanism for preventing longitudinal movement of the sensitized plate supporting bed at a time when pressure contact is obtained between the negative and the sensitized plate by the operation of the vacuum means;

Fig. 12 shows a detailed section taken on the line 12—12 of Fig. 11;

Fig. 13 is a view similar to that of Fig. 3 showing the operating mechanisms for effecting the raising and lowering of the structure by which the vacuum frame is supported when the bed is being moved beneath the negative;

Fig. 14 shows a horizontal detail section taken on the line 14—14 of Fig. 13;

Fig. 15 is an enlarged detailed section taken on the line 15—15 of Fig. 13, illustrating the method of mounting the ends of the lifting bars upon the adjustable horizontal supporting bars illustrated in Fig. 14;

Fig. 16 is an enlarged detailed sectional view taken on the line 16—16 of Fig. 13;

Fig. 17 is an enlarged detailed section taken on the line 17—17 of Fig. 13;

Fig. 18 is an enlarged detailed section taken on the line 18—18 of Fig. 1, with various parts of the machine removed, to show the method of securing the side bars of the negative supporting carriage in relative adjusted positions after they have been adjusted laterally to accommodate a vacuum frame of a desired size;

Fig. 19 shows a bottom plan view of one of the side bars of the carriage illustrated in Figs. 1 and 18;

Fig. 20 shows an enlarged top plan view of the rear portion of the mechanism by which the vacuum frame and negative frame and associated parts are adjusted transversely of the machine on the supporting structure provided therefor;

Fig. 21 shows a detailed section taken on the line 21—21 of Fig. 20; and

Fig. 22 shows a detailed section taken transversely of the machine on line 22—22 of Fig. 20.

The machine illustrated in the drawings comprises a frame 25 having longitudinal side frame members 26 connected by the transverse frame members 27 and including supporting legs 28 which rest on the floor or other support 29. The legs are connected by longitudinal truss frames 30 as shown particularly in Fig. 2. The frame 25 supports a movable bed adapted to carry the sensitized plates and it also carries a supporting structure upon which the vacuum frame and negative frame are movably mounted so that the vacuum frame may be positioned in various locations with respect to the surface of the sensitized plate mounted on the movable bed.

The side frame members 26 are of angular cross section comprising vertical webs 26ª having horizontal flanges 26ᵇ extending outwardly of the upper edges thereof, as shown particularly in Fig. 8. The webs 26ª having horizontal flanges 26ᶜ extending inwardly therefrom and longitudinal plates 26ᵈ are attached to the inner edges of the flanges 26ᶜ and extend downwardly therefrom. The side frame members are adapted to support the bed 32 of the machine having superimposed thereon a rubber blanket 33, which is engaged on its upper surface by the sensitized plate 34. The rubber blanket 33 is of the same width as the bed 32, and both the bed and the blanket are considerably larger in area than the sensitized plate 34 as shown particularly in Figs. 1 and 9, so that there is provided a marginal flat surface entirely surrounding the edges of the sensitized plate. At one end of the bed 32, a pair of clamping bars 35 and 36 are provided in a recess 37 formed in the bed and these bars are secured together by adjusting screws 38 so that after the rubber blanket 33 has been passed over the top of the upper clamping bar 35, its edge may be projected between the clamping bars and then upon tightening the screws 38, the edge of the blanket is held securely in place. The edge of the lower bar 36 is adapted to project beneath other flanges 39ª formed on plates 39 which are secured to the corners of the bed 32 by means of studs 40, as illustrated in Figs. 9 and 10. The top surfaces of the plates 39 are substantially flush with the upper surface of the rubber blanket 33. After being extended over the intermediate portion of the bed 32, the other end of the blanket is attached to two other clamping bars 35 and 36, which are similarly secured together by adjusting screws 38. This last mentioned clamping bar 36 also projects beneath plates 42 which are similar to the plates 39, except that they are provided with elongated slots 42ª engaged by the studs 43 so that the position of these plates may be adjusted. The innermost edge of the last mentioned clamping bar 36 is engaged by a transverse adjusting bar 44 secured to a pair of blocks 45 which are threadedly engaged by adjusting screws 46 extending through holes 47 in the bed so that their outer ends 46ª may be engaged by a screw-driver or the like, for the purpose of adjusting the positions of the blocks 45 in their recesses in the bed and thereby causing the bar 44 to move the contacting adjusting bar 36 longitudinally of the bed and thereby render the rubber blanket 33 taut. After thus being tightened, the movable adjusting bar 36 is secured in position by adjusting the plates 42 and then manipulating the studs 43 to secure them in adjusted position. After the rubber blanket 33 has been stretched taut, the sensitized plate 34 is laid on the upper surface thereof and secured in place by strips of adhesive tape 48, which are arranged to overlap the transverse edges of the sensitized plate and which are stuck down on the upper surface of the rubber blanket, thus holding the sensitized plate in fixed position while the upper sensitized surface thereof is subjected to the action of photographic light passing through the negative hereinafter described.

The bed 32 has a pair of side members 32ª and the intermediate portion of the underside thereof is hollowed out and provided with strengthening ribs 32ᵇ. The side members 32ª are adapted to travel on rollers 50 which roll on the track ways 51 formed on the upper surfaces of the horizontal flanges 26ᶜ of the side frames 26. The rollers 50 revolve on pins 52 which project outwardly from longitudinal roller bars 53, as shown in Figs. 5, 6 and 8. To keep the roller bars 53 and their rollers in proper position on the trackways 51, and to prevent displacement of the bed 32 from its proper position on the rollers, the bed and the trackways are geared together by means of upper rack bars 54, the lower rack bars 55 and the intermediate meshing pinions 56. The rack bars 54 are secured to bosses 57 formed on the under side of the bed 32, by means of screws 58, as shown in Fig. 8, and the rack bars 55 are secured to the depending plates 26ᵈ which are attached to the horizontal flanges 26ᶜ of the side frames. Brackets 59 are secured to the inner sides of the roller bars 53 and the pinions 56 are mounted to revolve on pins 60 which are carried by these brackets. In this way the longitudinal travel of the bed 32 on the rollers 50 and the corresponding movement of the roller bars 53, is regulated by the engagement of pinions 56 with the upper and lower rack bars, which extend throughout only a portion of the length of the side frame members as shown in Fig. 6.

To prevent lateral displacement of the bed 32 on the rollers 50, the bed 32 is provided at one side with a pair of depending brackets 61 having rollers 62 rotatably mounted thereon to bear against the inner edges of the horizontal flanges 26ᶜ of the side frame adjacent thereto, as shown in Fig. 4, and at the other side of the bed, somewhat similar brackets 63 are provided, having rollers 64 which engage the inner edge of the other horizontal flange 26ᶜ of the opposite side frame. The brackets 63 are slidably mounted on the under side of the bed through studs 65 engaging slots therein, and adjusting screws 66 passed through fixed slots 67 extending downwardly from the under side of the bed, these screws engaging coil springs 70, which bear against the brackets 63 so that, by adjusting the screws 66, the rollers 64 may be caused to bear against the edge of the adjacent side frame with any desired pressure, thereby preventing any lateral play of the bed during its longitudinal travel on the track-ways 51.

The longitudinal adjustment of the bed 32, is effected by means of a worm shaft 75 which extends longitudinally of the machine, being journalled in bearings 76, fixed on the transverse end frame members 27. The worm shaft 75 has a pulley 77 fixed thereon which is connected by a belt 78 with the pulley of a driving motor 79, as shown in Fig. 6, and the end of the shaft 75 is also provided with a hand wheel 80 which may be employed to effect rotation of the worm shaft when the motor is not in use or when a more precise adjustment is desired than that which can be obtained by the operation of the motor. The motor, which may be an electric motor, is, of course, provided with suitable circuit controlling devices so that it may be stopped when desired. The shaft is provided adjacent the hand wheel with a micrometer gauge 81 adapted to register with respect to a stationary index mark on the fixed collar 81ª. In this way fractional turns of the worm shaft 75 may be measured, but the larger degrees of movement of the bed 32 are indicated by a stationary index marked 82 carried by a plate 82ª fixed on the bed and adapted to travel adjacent the graduated scale 82ᵇ which is carried by the frame 25. The driving connection between the shaft 75 and the bed 32 is illustrated particularly in Fig. 7, where the shaft 75 is shown as threadedly engaging a pair of sleeves 83 and 84 which are mounted in collars 85 and 86, respectively, carried by a bracket 87 secured to the under side of the bed. These sleeves 83 and 84 are mounted for longitudinal movement in their respective collars but are prevented from rotating by keys 88. The sleeve 83 is provided at one end with an annular flange 83ª and at the other end of the collar 85 the sleeve 83 is threadedly engaged by an annular ring 89 provided with radial holes 90, adapted to be engaged by a suitable tool in effecting rotation thereof to maintain a tight engagement of the sleeve 83 with its collar 85. The other sleeve 84 is threadedly engaged at each end by a ring 91, each of these rings being provided with outwardly directed holes to be engaged by a suitable tool in effecting rotation thereof and, by means of these rings 91, the longitudinal position of the sleeve 84 may be regulated in its position relative to the sleeve 83, in order to take up any lost motion in the driving engagement of the shaft 75 with the bed 32, thus producing a precise movement of the bed 32 for each rotation of the shaft 75.

The photographic negative bearing the design or image which is to be transferred by the action of light to the sensitized surface of the plate 34, is mounted for adjustment above the bed 32 in a direction at right-angles to the direction of adjustment of the bed. Referring particularly to Figs. 1 and 7, the negative 95 is shown as being mounted in a negative frame 96 in which it is adjustably secured by means of adjustable clamps 97. The outwardly directed flange 96ª of the negative frame overlies the inwardly directed flange 98ª of the vacuum frame 98 and the negative frame is secured in accurate position on the vacuum frame by means of dowel pins 99 fixed on the vacuum frame and projecting upwardly through closely fitting holes in the flanges of the negative frame. The lower surfaces of the negative 95, negative frame 96, and of the vacuum frame 98 all lie in the same plane but the outer portion of the vacuum frame is offset upwardly and has secured to the under side thereof, an annular sealing flange 100 of rubber or the like, the lower edge of which normally projects slightly below the lower surface of the flange 98ª of the vacuum frame. This rubber flange is secured in place on the vacuum frame and extends completely around the under side thereof, forming an annular air channel 101 which has connections through a pipe extending upwardly through the frame with a flexible tube 102, extending to suitable apparatus by which the air is exhausted from the region beneath the vacuum frame and negative, when the vacuum frame has been lowered so that the lower sealing flange 100 engages the surface of the sensitized plate. The passage of air downwardly between the vacuum frame and the negative is prevented by means of an upper sealing frame 103, comprising four rigid members 104 which are flexibly connected at 105, thus forming a rectangular frame having a central opening over the negative adapted to permit the passage of light from a suitable source of light located above the machine. The rigid members 104 of the sealing frame 103 have secured to the under sides thereof, a rubber sealing member 105 having downwardly extending flanges 105ª which contact with the upper surface of the vacuum frame outside of the negative frame and with the upper surface of the negative, thus closing the gap between the vacuum frame and the negative throughout the periphery of the negative and forming an air seal. During the adjustment of the vacuum frame and negative from one position to another over the surface of the bed 32, the vacuum frame and the parts carried thereby, are supported by lifting bars 106, having inwardly directing flanges 106ª, which are adapted to form track-ways for rollers 107ª carried by the hangers 107. These hangers are connected to the vacuum frame 98 to support the same when the lifting bars 106 are elevated by the mechanism hereinafter described, and they are capable of rotation about vertical axes so that the rollers 107ª may be passed out of engagement with the lifting bars when it is desired to remove the bars from the machine preliminary to the removal of the vacuum frame 98. The vacuum frame is provided with handles 109 and the sealing frame 103 is provided with handles 108 by which these parts may be lifted upwardly by the operator when it is desired to change the negative and when it is desired to change the vacuum frame.

Referring particularly to Figs. 4, 5, 7, 8, and 13, it will be observed that the ends of the lifting bars, 106, are extended into slots in the ends of supporting posts 110, and are pivotally connected to the posts by means of pins 111. These posts 110 are provided at their lower ends with dowel pins 112, which extend downwardly into dowel holes formed in the supporting bars 113, which are mounted at the front and rear sides of the machine within the vertical webs 26ª of the side frame members 26. The supporting bars 113 are mounted for vertical movement by means of guide members 114 which are riveted thereto and which are adapted to slide in guide-ways 115 secured to the inner sides of the side frame members 26 as shown particularly in Figs. 13 and 17. The elevation of the supporting bars 113 is effected by means of certain operating mechanism comprising parallel actuating bars 116 which extend alongside of the respective supporting bars 113, as shown particularly in Figs. 1, 16, and 17, and which are supported by the links 118 and an intermediate crank arm 119. The links 118 and the crank 119 are rotatably mounted on studs 120 which threadedly engage the side frame members 26 and the upper ends of these members 118 and 119 carry pivot pins 121 which closely fit apertures in the actuating bars 116, as shown in Fig. 14, but which have enlarged heads 121ª, adapted to slide in slots 122 formed in the supporting bars 113. The bars 113 also have elongated vertically extending slots 123 which receive the upper ends of the crank 119 and the links 118, so that when these members are oscillated about the supporting pivots 120, the longitudinal or reciprocating movement of the members 116 effects a raising or lowering of the supporting bars 113, due to the engagement of the heads 121ª of the pins with the slots 122. In this way, the supporting bars 113 and the lifting bars 106 may be elevated to raise the vacuum frame out of contact with the sensitized surface of the zinc plate 34, when it is desired to move the vacuum frame by causing the rollers 107ª to travel on the lifting bars 106, or when it is desired to shift the position of the bed 32 beneath the structure which supports the vacuum frame and the negative. Each of the crank arms 119 extends below its pivot pin 120 and is pivotally connected there, at 124, to a link 125, adapted to be actuated by pivotally connected crank arm 126 fixed on a horizontal shaft 127. The shaft 127 is journaled in bearings 128 secured to the side frame members 26, as shown in Fig. 2, and the crank arms 126, at both sides of the machine, are fixed on this shaft so that when the shaft is actuated by the handle 129 fixed on the forward end of the shaft, the lifting bars 106 may be raised or lowered as desired.

As a precautionary measure to prevent the operator from attempting to raise the vacuum frame when the vacuum is on, that is, when the air has been exhausted from the region between the negative and the sensitized plate, causing them to be held in close contact by atmospheric pressure, means are provided for preventing the turning of the shaft 127 when the air-line is open to the suction pump. The flexible tube 102, previously referred to, leading from the vacuum frame 98, as shown in Fig. 1, is connected to a pipe 130, shown in Fig. 2, which leads to a valve 131 by which the exhaustion of air from vacuum frame is controlled. A suction pipe 132 leads from the valve 131 downwardly to a suction pump which may be located near the base of the machine or in another room. The operation of the vacuum valve 131, is effected by the rotation of a shaft 133 having a manually operated crank handle 134 which extends upwardly adjacent the front side frame member 26 of the machine. When this handle 134 is in the upright position shown in Fig. 2, the supporting bars 113 and the lifting bars 106 have been elevated so that the vacuum frame 98 is then out of contact with the sensitized plate, while at the same time, the vacuum valve 131 is closed. When the handle 134 of the vacuum valve is turned toward the right, as viewed in Fig. 2, the vacuum valve is open, and when that condition obtains, the handle 129 on the shaft 127, should occupy the position shown in Fig. 3, corresponding to the lowered position of the vacuum frame while it is in contact with the sensitized plate. The arm 126 on the shaft 127 is connected to an arm 135 on the shaft 133 by means of a link bar 136 which is pivotally connected by pin 137 to the crank 135 and which is provided at the other end with an elongated slot 136ª adapted to be slidably engaged by the pivot pin 138 which connects the arm 126 with the link 125. When the supporting bars 113 have been lowered and the handle 129 moved toward the right, as shown in Fig. 3, corresponding to the lowered position of the vacuum frame, the vacuum is turned on by opening the valve 131, thus causing the crank arm 135 to be moved to the position illustrated in Fig. 3 so that the link bar 136 and the crank 135 are in substantial alignment or slightly below dead center position, making it impossible for the operator to reverse the position of the handle 129 to raise the vacuum frame because of the fact that the pin 138 then engages the outer end of the slot 136ª in the link bar 136. It is, therefore, necessary for the operator to move the handle 134 of the vacuum valve to the upright position shown in Fig. 2, before it is possible to operate the handle 129 to raise the vacuum frame. It will be understood that this connecting mechanism between the shaft 127 and 133 is duplicated at both sides of the machine, although the operating handles 129 and 134 are located preferably only at the front side of the machine.

The machine also comprises means for preventing the longitudinal shifting of the bed 32 when the vacuum valve 131 is open. For this purpose, the shaft 133, which controls the operation of the vacuum valve, has fixed thereon, a cam 140 which is adapted to operate through the plunger 141 of an electric switch 142, carried by bracket 143 attached to the frame of the machine, as shown in Fig. 2ª. When the lever 134 is turned to open the vacuum valve 131, the cam 140 forces the plunger 141 inwardly and closes the switch 142, thereby closing the circuit of the electro-magnet 145, shown in Fig. 11. This electro-magnet, and other co-operating parts, are mounted on a supporting plate 146 which is secured by bolts 147 to the end frame of the machine, and the electro-magnet has a core 148 which is connected by a threaded member 149 with a bell-crank lever 150, pivoted at 151 on the plate 146. The threaded member 149 has coil springs 152 mounted thereon on opposite sides of one arm of the bell-crank lever 150 and nuts 153 threadedly engage the member 149 adjacent the outer ends of each of the springs 152 so that the compression of these springs may be adjusted to obtain the desired action of the lever 150. The lever 150 carries a boss 150ª which is adapted to engage a stop 154, provided with a bumper of rubber 154ª. The upwardly extending arm of the bell-crank lever 150 is bifurcated as shown at 150ᵇ, to be engaged by a pin 155, which is fixed on a link 156 pivoted at 156ª on the plate 146, as shown in Fig. 12. The link 156 is provided with an outwardly projecting cam member 157 which extends between the lower ends of two semi-circular brake members 158 which are pivotally mounted on a pin 159, secured on the plate 146. The brake members 158 are mounted within a brake drum 160, the hub of which is secured on the screw shaft 75 by means of a set screw 161, this brake drum being located between the plate 146 and another plate 162 which is secured to the first plate and spaced therefrom by the members 163, shown in Fig. 11. When the lever 134, shown in Fig. 2, is operated to open the vacuum valve 131, thereby permitting the air to be exhausted from the region between the vacuum frame and the sensitized plate, so that the vacuum frame and negative are held in close contact with the sensitized plate by atmospheric pressure, the electro-magnet 145 is energized to move the magnetic core 148 upwardly, thereby rocking the bell-crank lever 150, and turning the cam 157 so that the lower ends of the brake members 158 are forced apart and into contact with the inner peripheral surface of the brake drum 160, thereby holding the screw shaft 75 against rotation and preventing longitudinal movement of the bed 32 upon which the sensitized plate is mounted.

After the vacuum frame and negative have been elevated from the surface of the sensitized plate by the mechanism heretofore described, the vacuum frame is adjusted transversely of the machine on the lifting bars 106 by certain means illustrated particularly in Figs. 1, 4, 5, 20, 21 and 22. Motion is imparted to the vacuum frame and the parts carried thereby by register blocks or slide blocks 165 which are mounted to slide on the slide bars 166. As shown in Fig. 7, these slide bars 166 are mounted in under-cut recesses formed on the lower sides of the register blocks 165 and the lower sides of these under-cut recesses are closed by plates 167 which extend beneath the slide bars and project laterally beyond the register blocks for connection with certain curtains hereinafter referred to. The vacuum frame 98 is connected to the register block 165 at one side through a dowel pin 168, which is centrally located on the inwardly projecting flange 165ª of the register block, as shown in Fig. 7, and which projects upwardly to engage an aperture 169 in the upper upwardly projecting flange of the vacuum frame. At the other side of the vacuum frame, the register block 165 is provided with a positioning member 170, having a notch therein to be engaged by a laterally projecting lug 171, fixed on the vacuum frame. When the vacuum frame is lowered to cause the lug 171 to engage the notch in the member 170, and to cause the aperture 169 to be engaged by the dowel pin 168, the vacuum frame is then capable of being moved on the lifting bars 106 by the movement of the register blocks 165 on the slide bars 166.

The simultaneous movement of the register blocks 165 is effected by means of two rods 172, one of which is connected to each of the register blocks, as shown in Fig. 1, and detachably engaged at its other end with a longitudinally extending bar 173. The bar 173 is connected by bolts 174 with a pair of transversely movable rack bars 175, shown particularly in Figs. 21 and 22. These rack bars are mounted to travel in guides 176 carried by the rear longitudinal frame member 26 and by brackets 177 secured thereto. The upper surfaces of the rack bars are overlapped by plates 178, which are secured to the guide members by means of screws 179, extending upwardly through apertures therein and having coil springs 180 mounted thereon, so that the plates are held resiliently against the upper surfaces of the guide members. The plates 178 may be adjustably limited in downward movement by means of screws 181 which engage the plates and bear against the top surfaces of the guide members 176. The screws 181 are secured in adjusted position by means of the horizontally extending set-screws 182. The rack bars 175 are moved in guides by means of a longitudinal shaft 185 which is journaled in bearings 186 carried by the rear longitudinal frame member 26 and which is provided with a pair of pinions 187 meshing with the teeth 175ª of one of the rack bars. Each pinion comprises a member 187ª which is fixed on the shaft 185 by means of a key 188, and also another relatively adjustable pinion member 187$^b$ which is free to rotate on the shaft but which is secured to its complementary member by means of set screws 189 fastened to the member 187$^a$ and threadedly engaging the member 187$^b$. Each member 187$^a$ is provided with angular slots 190, to be engaged by the screws 189 so that each member 187$^b$ may be adjusted angularly on its complementary member 187$^a$ to cause the teeth of these members to take up any back-lash which may exist in the meshing of the teeth of the pinions and the rack bars. The rotation of the shaft 185 is effected by means of a worm wheel 191 fixed thereon and meshing with a worm 192, secured on the rear end of a transverse shaft 193, which is journaled in bearings 194 fixed on the front and rear longitudinal frame members 26, as shown in Fig. 1. This shaft 193 is adapted to be rotated by a hand wheel 195, located at the front of the machine, and fractional revolutions of this shaft indicated by a micrometer gauge 196 which moves with the hand wheel and which is adapted to register on an index mark 197, carried by a collar 198 mounted adjacent the hand wheel. The larger movements of the vacuum frame on the lifting bars 106 are indicated by a graduated scale 199 which is marked on one of the slide bars 166 and which registers with an index member 200, carried by the adjacent register block 165.

The vacuum frames 98 and the negative frames 96 are commonly of oblong rectangular shape, as illustrated in the drawings, and since it is desirable to locate the image carried by the negatives in different right-angular positions on the sensitized plate, at times, and also to permit the insertion in the machine of vacuum frames, and negative frames of different sizes, means are provided for adjusting the supports and actuating mechanism of the vacuum frame longitudinally of the machine to permit the turning of the vacuum frame after it has been lifted out of the machine and also to permit the use of vacuum frames of different sizes. For this purpose, the slide bars 166 are adjustable toward and away from each other and the rods 172 which actuate the register blocks 165, are also adjustable longitudinally on the bar 173. The lifting bars 106 are also adjustable laterally to correspond with the spaced relation of the slide bars 166. These features of adjustment are illustrated more particularly in Figs. 1, 2, 15, 16, 17, 18, 19, 20, and 21. The ends of the slide bars 166 are mounted on longitudinal plates 205 which are secured on the upper horizontal flanges 26$^b$ of the side frame members 26. At the front of the machine, the plate 205 is provided with a plurality of spaced holes 206, which are spaced regularly on the opposite sides of the transverse center line of the machine, and these holes are adapted to be engaged by dowel pins 207, which are fixed in the bars 166 and extend downwardly therefrom, as shown in Fig. 18. At the rear ends of the bars 166, they are provided on their under sides with rectangular lugs 208, which are adapted to engage recesses 209 formed in the other plate 205, and spaced to correspond with the spacing of the holes 206. The plates 205 project outwardly beyond the outer edges of the flanges 26$^b$ of the frame members and are provided with longitudinal slots 210, engaged by upwardly extending pins 211, which are fixed in bars 212, located beneath the outwardly projecting portions of the plates 205. The bars 212 are held in place by angle plates 213, which are secured to the outer edges of the plates 205 and to the under side of the flanges 26$^b$, and these bars 212 are adjustable longitudinally, as hereinafter described, in order to effect the corresponding adjustment of the pins 211 and of the slide bars 166 which are engaged with the pins 211 by means of lateral notches 214 formed in the ends thereof, as shown in Fig. 19, thus forming hooks 215 which project on the outer sides of the upwardly extending pins. The upper parts of the pins 211 are threaded to be engaged by hand-nuts 216, so that the bars 166 may be clamped in desired position. In order to effect a change in the lateral spaced relation of the slide bars 166, it is necessary to release the hand-nuts 216, to permit the elevation of the bars 166 until the pins 207 are disengaged from their holes 206, and until the lugs 208 are disengaged from the notches 209. The bars 212 may then be adjusted longitudinally of the machine to locate the pins 211 in new positions corresponding to the newly determined positions of the pins 207 and the lugs 208. A separate bar 212, is provided at each side of the machine for each end of each bar 166, as shown particularly in Fig. 2, and these bars 212 are provided with downwardly projecting ears 217, which are pivotally connected with links 218, mounted to extend longitudinally of the machine beneath the plates 205. The links 218 are pivotally connected to the upper ends of cranks 219, which are fixed on the ends of shafts 220, one of which is provided adjacent each end of the machine, as shown in Figs. 1, 2 and 4, being journaled in bearing brackets 221, which extend downwardly from the side frame members. The cranks 219 at the forward side of the machine are provided with outwardly extending handles 222 which may be engaged by the operator to effect longitudinal movement of the bars 212. By this arrangement, a simultaneous movement of the rods at the front and rear sides of the machine is effected so that both ends of a bar 166 are simultaneously adjusted in equal degree.

When the bars 166 are separated to a greater degree, they will accommodate a vacuum frame 98 of larger size, and when the bars 166 are brought closer together, they will permit the insertion of a vacuum frame of lesser size and will also permit the insertion of a vacuum frame in a different relative angular position. That is, the particular vacuum frame illustrated in Fig. 1, may be removed from the machine and turned through an angle of 90°, after which it may be reinserted with the bars 166 closer together. For this purpose, the vacuum frame is provided with an additional hole 169, and an additional lug 171, located on the longitudinal sides of the vacuum frame as shown in Fig. 1, for engagement with the dowel pin 168 and the notched bar 170, respectively, after the vacuum frame has been turned to the new position.

The relative spaced relation of the lifting bars 106 is regulated to correspond with the spaced relation of the slide bars 166, and for this purpose a plurality of holes 225 are provided in the supporting bars 113, as shown in Fig. 1, to permit the engagement with any desired holes of the dowel pin 112, which are mounted on the lower ends of the supporting posts 110, as shown in Fig. 15.

An adjustment in the spaced relation of the rods 172 is also provided in order to permit the actuation of the register blocks 165 in all spaced relations of the slide bars 166. As shown particularly in Figs. 20 and 21, the bar 173 is provided with a plurality of notches 226 which are engaged by threaded pins 227, extending upwardly from the rods 172. The pins 227 may be caused to engage any desired notches 226, depending upon the spaced relation of the rods 172 and the parts are held in fixed relation, after adjustment, by means of the hand-nuts 228, having knurled heads 228ª and having lower bevelled faces 228ᵇ. The inclined faces 228ᵇ are adapted to co-act with the inclined surfaces 226ª of the notches and the hand-nuts are turned down to their lower clamping positions.

In order to protect that portion of the sensitized plate which is not located beneath the negative and the vacuum frame, from the action of light, during the exposure of the negative, the surrounding portions of the sensitized plate are adapted to be covered by curtains similar in construction to those described in my prior patent above referred to. A pair of curtains 230 are mounted on the opposite sides of the vacuum frame supporting structure, as shown particularly in Fig. 7, these curtains being normally wound on rollers 231, which are carried by holding brackets 232, attached to the sides of the bed 32 of the machine. These rollers 231 are similar to ordinary window curtain rollers and the curtains may be withdrawn therefrom and passed around idler rollers 233, after which the curtains are extended inwardly over the sensitized plate and the bars 234 attached to the inner edges thereof are connected to the plates 167, carried by the register blocks 165, by means of pins 235, which are attached to these plates and which engage notches in the bars 234. Other curtains 236 are mounted on rollers carried by holders 237, which are located between the slide bars 166, the holders being extended over the slide bars and held in place by pins 238 which project upwardly from the ends of the bars and engage the notched ends of the holders 237. The curtains may be drawn inwardly from the rollers carried by the holders and attached to the opposite sides of the vacuum frame by means of pins 239 projecting upwardly from that frame.

It is thought that the mode of operation of the apparatus, whereby the various adjustments of the apparatus are effected and the vacuum pressure system operated to obtain exposures of negatives in various positions over the surface of the sensitized plate, will be apparent from the foregoing description. It will be understood that the invention may be constructed in various forms within the scope of the appended claims.

I claim:

1. The combination in a photo-composing machine of a horizontal flat bed for supporting a sensitized plate of lesser area than said bed, a blanket on said bed beneath said plate, said blanket being of larger area than said plate, means for supporting a negative opposite said press plate, said negative supporting means being adapted to overlap the edges of said sensitized plate and to contact with a projecting portion of said blanket, and vacuum pressure means for obtaining a close contact between said negative and said sensitized plate in all of the positions of said negative.

2. The combination in a photo-composing machine of a flat bed, a flexible blanket mounted on said bed, adhesive means for securing on said blanket a sensitized plate of lesser area than said blanket and said bed, means for supporting a negative in various positions over said sensitized plate including positions overlapping the edges of said sensitized plate, and vacuum pressure means for obtaining a close contact between said negative and said sensitized plate in all of said positions of said negative.

3. The combination in a photo-composing machine of a one-piece bed mounted in horizontal position, a rubber blanket mounted on said bed, means for holding said blanket taut, adhesive means for securing on said blanket a sensitized plate of lesser area than said blanket, and a negative supporting frame mounted for movement to position a negative in various positions over said sensitized plate including positions overlapping the edges of said plate, and vacuum pressure means associated with said negative carrying means for obtaining a close contact between said negative and said sensitized plate in all of said positions of said negative.

4. The combination in a photo-composing machine of a flat one piece bed, a rubber blanket mounted on said bed, said bed having recesses in the upper surface thereof, clamping means engaging the edges of said blanket beneath the upper surface of said blanket and within said recesses, and means for adjusting said clamping means to render said blanket taut.

5. The combination in a photo-composing machine of a flat one piece bed having transverse recesses in the upper surface thereof, clamping bars in said recesses, a flexible blanket mounted on said bed and over said bars with its lateral edges secured to said bars at the outer sides thereof, and means for effecting relative adjustment of said bars to tighten said blanket.

6. The combination of a photo-composing machine of a bed provided with a flat upper surface adapted to support a sensitized plate of lesser area than said bed, a relatively thin adhesive means overlapping said plate for securing the edges thereof to said surface carried by said bed, and means for positioning a negative in various locations over said sensitized plate including positions overlapping said adhesive means.

7. The combination in a photo-composing machine of a bed provided with a flat upper surface adapted to support a sensitized plate of lesser area than said bed, a relatively thin adhesive means overlapping said plate for securing the edges thereof to said surface carried by said bed, means for positioning a negative in various locations over said sensitized plate including positions overlapping said adhesive means, and means for obtaining a close contact between said negative and said sensitized plate in said overlapping positions of said negative.

8. The combination in a photo-composing machine, of a frame, a bed adapted to support a sensitized plate, rollers interposed between said frame and said bed to travel on said frame, said bed being arranged to rest on said rollers and move with respect to said rollers during their travel on said frame, and supporting means for supporting said negative carrying frame during the movement thereof over said bed in a direction transverse to the direction of movement of said bed.

9. The combination in a photo-composing machine, of a bed provided with a flat surface adapted to engage a sensitized plate of lesser area than said surface, said bed being provided with flat surfaces extending outwardly beyond the edges of said sensitized plate, a relatively thin adhesive means overlapping said plate for uniting the edges thereof with said flat surface carried by said bed, a vacuum frame having a negative mounted therein and provided with an annular compressible member, means for effecting relative adjustment of said bed and said vacuum frame to position said vacuum frame in various positions including positions wherein said negative and said frame overlap an edge of said sensitized plate with said compressible member engaging said relatively thin adhesive means and said plate and extending flat surface, and means for exhausting the air from the region between said vacuum frame and said bed for causing atmospheric pressure to effect a close contact between said negative and the opposed portion of said sensitized plate.

10. The combination in a photo-composing machine of a frame having parallel trackways, a pair of movable roller bars, a plurality of rollers each carried by one of said bars and arranged to travel on one of said trackways, a bed having parts mounted to rest on said rollers, means for adjusting said bed on said rollers, separate connecting means between said bed and said frame for regulating the travel of said rollers on said trackways, and a negative carrying frame mounted for adjustment toward and from said bed.

11. The combination in a photo-composing machine of a frame, a bed mounted on said frame for supporting a sensitized plate, a pair of supporting bars carried by opposite sides of said frame and extending longitudinally thereof, a pair of lifting bars extending transversely of said frame and carried by said supporting bars, means for raising and lowering said supporting bars, and a negative carrying frame mounted on said lifting bars.

12. The combination in a photo-composing machine of a frame, a bed mounted on said frame for supporting a sensitized plate, a pair of supporting bars carried by opposite sides of said frame and extending longitudinally thereof, a pair of lifting bars extending transversely of said frame and carried by said supporting bars, means for raising and lowering said supporting bars, a negative carrying frame mounted on said lifting bars, and means for varying the spaced relation of said lifting bars on said supporting bars for accommodating negative carrying frames of different sizes and in different positions.

13. The combination in a photo-composing machine of a frame, a bed mounted on said frame for supporting a sensitized plate, a pair of slide bars extending transversely of said frame over said bed, a pair of separate register blocks each movably mounted on one of said slide bars, a negative carrying frame detachably connected with said register blocks for movement therewith, operating mechanism for positively moving said register blocks on said slide bars, graduated means associated with one of said slide bars for indicating the position of said negative carrying frame, and means for supporting said negative carrying frame in an elevated position during said movement.

14. The combination in a photo-composing machine of a frame, a bed mounted on said frame for supporting a sensitized plate, a pair of slide bars extending transversely of said frame over said bed, a pair of register blocks movably mounted on said slide bars, a negative carrying frame connected with said register blocks for movement therewith, operating mechanism for positively moving said register blocks on said slide bars, a pair of lifting bars extending parallel to said slide bars and comprising means for supporting said negative carrying frame, and means for elevating said lifting bars to hold said negative carrying frame away from said bed during said movement of said register blocks.

15. The combination in a photo-composing machine of a frame, a bed mounted on said frame for supporting a sensitized plate, a pair of lifting bars extending transversely of said frame opposite said bed, a pair of supporting bars mounted at opposite sides of said frame and having means for supporting the ends of said lifting bars in different relative positions thereon, means for raising and lowering said supporting bars, a negative carrying frame adapted to be supported by said lifting bars, and operating mechanism for positively moving said negative carrying frame transversely of said machine on said lifting bars when said bars are lifted.

16. The combination in a photo-composing machine of a frame having longitudinal side members, a pair of supporting bars mounted for vertical movement on said side members, said supporting bars having a plurality of spaced holes therein, a pair of lifting bars extending transversely of said frame, supporting posts connected to the ends of said bars and having pins adapted to engage selected holes in said supporting bars, a negative carrying frame mounted on said lifting bars, and means for raising said supporting bars to lift said lifting bars.

17. The combination in a photo-composing machine of a frame having longitudinal side members, a pair of supporting bars mounted for vertical movement on said side members, said supporting bars having a plurality of spaced holes therein, a pair of lifting bars extending transversely of said frame, supporting posts connected to the ends of said bars and having pins adapted to engage selected holes in said supporting bars, a negative carrying frame mounted on said lifting bars, and mechanism comprising pivoted links having operating connections with said supporting bars for raising and lowering said bars.

18. The combination in a photo-composing machine of a frame having longitudinal side members, a pair of supporting bars mounted for vertical movement on said side members, said supporting bars having a plurality of spaced holes therein, a pair of lifting bars extending transversely of said frame, supporting posts connected to the ends of said bars and having pins adapted to engage selected holes in said supporting bars, a negative carrying frame mounted on said lifting bars, mechanism comprising pivoted links having operating connections with said supporting bars for raising and lowering said bars, and means for positively moving said negative carrying frame transversely of said machine on said lifting bars.

19. The combination in a photo-composing machine of a frame having longitudinal side members having parts provided with longitudinal slots, a pair of parallel slide bars extending transversely of said machine, clamping means carried by the ends of said bars for engaging said slots, a negative carrying frame, means movable longitudinally of said slide bars for effecting parallel movement of said negative carrying frame, and means operative upon release of said clamping means for moving said clamping means in said slots and adjusting the spaced relation of said slide bars.

20. The combination in a photo-composing machine of a frame having longitudinal slide members, a pair of members mounted for movement on each of said side members, clamping means carried by said movable members, a pair of slide bars extending transversely of the machine and having their ends detachably connected by said clamping means with said movable members, operating mechanism for simultaneously adjusting the movable members connected to opposite ends of the same slide bar, and register means movable longitudinally of said slide bars and having means for detachable engagement with the negative carrying means.

21. The combination in a photo-composing machine of a frame, a pair of slide bars extending between opposite sides of said frame, register blocks movable on said bars, a negative carrying frame having connection for movement with said blocks, means for supporting said negative carrying frame during said movement, a pair of rods each connected with one of said register blocks and extending parallel to said bars, an actuating bar attached to said rods, and operating mechanism connected with said actuating bar for effecting movement of said register blocks on said slide bars.

22. The combination in a photo-composing machine of a frame, a pair of slide bars extending between opposite sides of said frame, register blocks movable on said bars, a negative carrying frame having connection for movement with said blocks, means for supporting said negative carrying frame during said movement, a pair of rods each connected with one of said register blocks and extending parallel to said bars, an actuating bar attached to said rods, operating mechanism connected with said actuating bar for effecting movement of said register blocks on said slide bars, means for varying the spaced relation of said slide bars, and means for varying the points of attachment of said rods on said actuating bar.

23. The combination in a photo-composing machine of a frame having longitudinal side members, a pair of slide bars extending between said side members, a pair of register blocks each slidably mounted in one of said slide bars, a pair of rack bars each connected with one of said register blocks, a longitudinal shaft, pinions mounted on said shaft to mesh with said rack bars, means for rotating said shaft, and a negative carrying frame mounted for movement with said register blocks.

24. The combination in a photo-composing machine of a frame having longitudinal side members, a pair of slide bars extending between said side members, a pair of register blocks each slidably mounted in one of said slide bars, a pair of rack bars each connected with one of said register blocks, a longitudinal shaft, pinions mounted on said shaft to mesh with said rack bars, means for rotating said shaft, and a negative carrying frame mounted for movement with said register blocks, said pinions comprising complementary parts having relative angular adjustment for taking up lost motion between the teeth of said pinions and the teeth of said rack bars.

25. The combination in a photo-composing machine of a frame having longitudinal side members, a pair of slide bars extending between said side members, a pair of register blocks each slidably mounted in one of said slide bars, a pair of rack bars each connected with one of said register blocks, a longitudinal shaft, pinions mounted on said shaft to mesh with said rack bars, means for rotating said shaft, a negative carrying frame mounted for movement with said register blocks, and guiding means for said rack bars comprising resilient means for maintaining the proper positions thereof.

26. The combination in a photo-composing machine of a frame, a bed carried by said frame to support a sensitized plate, a pair of supporting bars mounted for vertical movement in said frame, a negative carrying vacuum frame adapted to be carried by said supporting bars and to be lowered into contact with said sensitized plate when said supporting bars are lowered, operating mechanism for raising and lowering said supporting bars, a suction line leading from said vacuum frame, a valve for controlling said suction line, and means comprising a crank and a connecting link for preventing the operation of said mechanism to raise said vacuum frame when said valve is open.

27. The combination in a photo-composing machine of a frame, a bed for supporting a sensitized plate, a negative carrying vacuum frame, means for lowering said vacuum frame into contact with said sensitized plate and for raising said frame therefrom, a suction line leading from said vacuum frame, a valve in said suction line, means for operating said valve, means for adjusting said bed longitudinally of said frame when said vacuum frame is elevated therefrom, and means for preventing operation of said last named means when said vacuum frame is lowered and said valve is open.

28. The combination in a photo-composing machine of a flat bed provided with a flat surface adapted to engage a sensitized plate of lesser area than said bed, a relatively thin adhesive means overlapping said plate for uniting the edges thereof with said surface, means for locating a negative in various relative positions with respect to said sensitized plate including positions overlapping said adhesive means and the edges of said plate, and vacuum pressure means for obtaining a close contact between said negative and said sensitized plate in all of said positions.

29. The combination in a photo-composing machine of a bed provided with a part having a flat surface adapted to engage a sensitized plate of lesser area than said bed, said bed having flat surfaces extending outwardly beyond the edges of said sensitized plate, a relatively thin adhesive means overlapping said plate for uniting the edges thereof with said flat surface extending beyond said plate, a negative carrying vacuum frame, means for effecting relative adjustment of said vacuum frame and said negative for locating said negative in various positions over the surface of said sensitized plate including positions overlapping the edge of said sensitized plate, and means for exhausting the air from the region beneath said vacuum frame for obtaining a close contact between said negative and said sensitized plate.

30. The combination in a photo-composing machine of a bed provided with a part having a flat surface adapted to engage a sensitized plate of lesser area than said bed, said bed having flat surfaces extending outwardly beyond the edges of said sensitized plate, a relatively thin adhesive means overlapping said plate for uniting the edges thereof with said flat surface extending beyond said plate, a negative carrying vacuum frame, means for adjusting said bed horizontally in one direction, means for adjusting said negative carrying frame transversely to the direction of adjustment of said bed, and means for exhausting the air from the region between said vacuum frame and said bed for obtaining a close contact between said negative and said sensitized plate.

31. The combination in a photo-composing machine, of a frame, a bed adapted to support a sensitized plate, supporting rollers mounted to roll on said frame, said bed being mounted on said rollers for relative movement with respect to said rollers during the movement of said rollers on said frame, and precision means for effecting adjustment of said bed on said rollers.

In testimony whereof, I have subscribed my name.

ALEXANDER T. KOPPE.